United States Patent [19]

Bolenbaugh et al.

[11] Patent Number: 4,793,448
[45] Date of Patent: Dec. 27, 1988

[54] CALIPER SUPPORT KEY

[75] Inventors: Daniel L. Bolenbaugh, South Bend, Ind.; Lawrence C. Dow, Berrien Springs, Mich.

[73] Assignee: Allied-Signal Inc., Morristown, N.J.

[21] Appl. No.: 174,752

[22] Filed: Mar. 29, 1988

[51] Int. Cl.$^4$ ............................................. F16D 65/02
[52] U.S. Cl. ............................... 188/73.43; 188/73.35; 188/73.45
[58] Field of Search ............... 188/73.35, 73.43, 73.44, 188/73.45, 73.36

[56] References Cited

U.S. PATENT DOCUMENTS

| | | | |
|---|---|---|---|
| Re. 31,794 | 1/1985 | Burgdorf et al. | 188/73.35 |
| 3,625,314 | 12/1971 | Rinker | 188/72.4 |
| 3,913,709 | 10/1975 | Burgdorf et al. | 188/73.4 |
| 4,285,417 | 8/1981 | Ostwald | 188/73.3 |
| 4,372,428 | 2/1983 | Delaunay et al. | 188/73.35 |
| 4,393,963 | 7/1983 | Oltmanns, Jr. et al. | 188/73.45 |
| 4,424,886 | 1/1984 | Frigger et al. | 188/73.35 |
| 4,560,039 | 12/1985 | Bolenbaugh et al. | 188/73.45 |
| 4,574,922 | 3/1986 | Varin et al. | 188/73.35 |

FOREIGN PATENT DOCUMENTS

| | | | |
|---|---|---|---|
| 1506592 | 12/1967 | France | 188/73.43 |
| 2249574 | 5/1975 | France | 188/73.43 |

Primary Examiner—George E. A. Halvosa
Attorney, Agent, or Firm—Larry J. Palguta; Ken C. Decker

[57] ABSTRACT

The caliper support key (10) includes two generally U-shaped metallic key members (20, 40) which are shaped complementary to one another. Each member (20, 40) has a radially outer arm (22, 42) which includes a radially outer arm end (28, 48) that extends further than and outwardly at an angle away from an associated radially inner arm (24, 44). The radially outer arm end (28) of the outer key member (20) includes at least one aperture (31) which is in axial alignment with at least one opening (33) disposed within the associated radially outer arm end (48) of the inner key member (40). The aperture (31) and opening (33) are aligned eccentrically relative to one another in a circumferential direction relative to the brake. The caliper support key (10) retains the caliper (70) in operational radial alignment with the support member (60), and provides compression of a resilient member (50) disposed between the key members (20, 40) when braking torque causes a circumferential movement of the caliper (70) relative to the support member (60). A retainer member (65) extends through the eccentrically aligned aperture (31) and opening (33) to be received within a receptacle (63) in the support member (60), and thereby retain the caliper support key (10) on the support member (60).

3 Claims, 1 Drawing Sheet

CALIPER SUPPORT KEY

The present invention relates to a caliper support key for a disc brake, and particularly to a support key that is compressible in order to receive braking torque.

Disc brakes utilize various mechanisms to support the caliper relative to the support member, often with spring mechanisms permitting some circumferential movement of the caliper relative to the support member. The caliper may be retained by the support member by utilizing a separate cold formed key and leaf type of caliper support spring. This type of key and support spring can result in wear of the support member, the associated caliper surface with engages the key, the key and the spring, and all of this resulting in a caliper that is loosely positioned on the support member. Many times the design of the caliper support spring is a contributor to the wear problem. The caliper support spring creates a theoretical line of contact at its two ends with the associated caliper surface with which it engages. As the spring is compressed, the two lines of contact separate from each other and scrape the surface of the caliper. As material is worn from the surfaces which mate with one another, the caliper support spring relaxes and some of the retention loading is lost. The result is that the caliper is beaten between the support plate abutments by shock loads, which causes further wear and loosening.

It is desirable to increase the area of contact between the support spring and the surface of the caliper which the spring engages, in order to reduce the amount of wear which initiates the loosening of the caliper support. It would be advantageous to utilize a flat wear plate or surface that maintains planar rather than line contact with the caliper surface for the entire length of the caliper surface.

The present invention provides solutions to the above problems by providing a caliper support key in a disc brake having a caliper supported by support member, the support member having one of a recess and a protrusion and the caliper having the other of the recess and protrusion, the caliper support key comprising an outer key member that is generally U-shaped and which includes radially outer and radially inner arms connected by a radially extending part, the radially outer arm having an end extending further than and outwardly at an angle away from the radially inner arm, and at least one one aperture disposed within the end of the radially outer arm, an inner key member that is shaped complementary to said outer key member, the inner key member also having a radially outer arm with an end which extends further than and outwardly at an angle away from an associated radially inner arm which is connected by a radially extending part with the outer arm of the inner key member, the end of the inner key member having at least one opening therethrough which is in axial alignment with the one aperture, a resilient member disposed between the radially extending parts of the inner and outer key members, the caliper support key received between the protrusion and recess so that the outer key member engages the recess and the inner key member engages the protrusion, and a retraining member extending through said one aperture and one opening and received within a receptacle of one of the support member and caliper, the one aperture and one opening being aligned eccentrically relative to one another, whereby the caliper support key retains the caliper in operational alignment with the support member and receives braking torque so that the resilient member permits movement between the key members.

One way of carrying out the invention is described in detail below with reference to the drawings which illustrate an embodiment in which.

Figure 1:
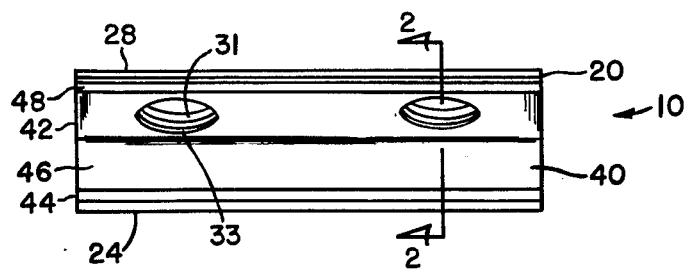
FIG. 1 is a plan view of the caliper support key of the present invention.
Figure 2:
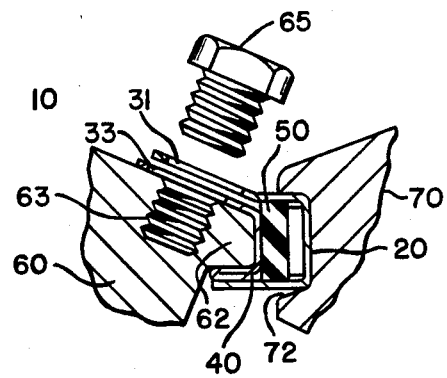
FIG. 2 is a section view taken along view line 2—2 of FIG. 1 and with the support key disposed between a support member and caliper.
Figure 3:
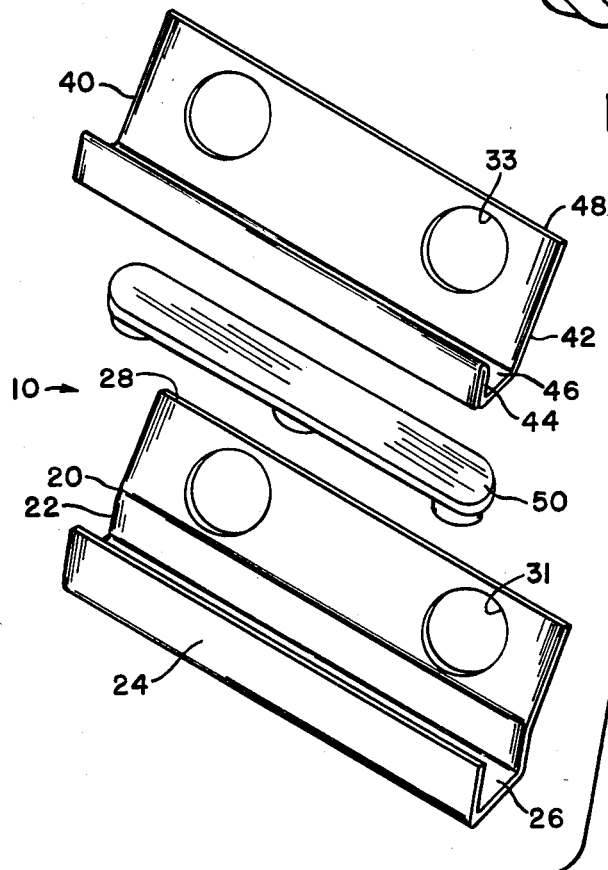
FIG. 3 is an exploded isometric view of the caliper support key of the present invention.

The caliper support key is referenced generally by reference numeral 10 in FIGS. 1-3. Caliper support key 10 comprises a generally U-shaped outer key member 20 which includes a radially outer arm 22 and a radially inner arm 24 connected by a radially extending part 26. Radially outer arm 22 includes a radially outer arm end 28 which extends further than and outwardly at an angle away from radially inner arm 24. Arm end 28 includes a pair of apertures 31. An inner key member 40 comprises a radially outer arm 42 which is connected by radially extending part 46 with a radially inner arm 44. The radially inner arm 44 of inner key member 40 comprises a folded-over portion which doubles the effective thickness thereof relative to the thickness of radially extending part 46 and radially outer a arm 42. Radially outer arm 42 includes a radially outer arm end 48 which extends further than and outwardly at an angle away from radially inner arm 44. Radially outer arm 42 includes a pair of openings 33. Each aperture 31 is axially aligned with an adjacent opening 33, and each aperture 31 is aligned eccentrically relative to the adjacent opening 33 and in a circumferential direction relative to the brake.

Disposed between the radially extending parts 26 and 46 is a resilient member 50. Resilient member 50 is captured between parts 26, 46 and provides for movement of key members 20, 40 relative to one another. Caliper support key 10 is disposed between a protrusion 62 of support member 60 and a recess 72 of caliper 70. The outer perimeter of U-shaped outer key member 20 is received within recess 72 while the inner perimeter of U-shaped inner key member 40 receives protrusion 62 of support member 60. Support member 60 includes a threaded opening 63 which receives therein retainer member or screw 65. Retainer member 65 extends through an eccentrically and axially aligned aperture 31 and opening 33. The eccentric alignment of each aperture 31 relative to the adjacent opening 33 allows the smallest diameter hole to be presented for the retainer member or screw 65 which attaches caliper support key 10 to support member 60, while still allowing for circumferential movement of outer key member 20 relative to inner key member 40 in response to braking torque imposed upon caliper 70.

As shown in FIG. 2, caliper support key 10 is disposed between support member 60 and caliper 70 so that braking torque which effects circumferential movement of caliper 70 relative to the disc brake can cause compression of resilient member 50 and a corresponding movement of outer key member 20 relative to inner key member 40. The retaining member 65 provides positive lock positioning of key 10 when the key experiences transverse forces relative to the brake. Outer key member 20 increases the area of contact between key member 20 and recess 72 of caliper 70. This reduces substantially the amount of wear experienced by the respective key member and associated contact surface of the caliper. Additionally, a primary functional advantage is that key 10 maintains planar rather than line contact with caliper recess 72 for the entire length of the recess.

The caliper support key of the present invention provides considerable advantages in addition to the minimization of wear by providing planar contact surfaces. The support key can be an inexpensive stamped steel construction which is manufactured easily and inexpensively. Throughout usage of the key in a disc brake, key 10 will retain its resilience and not relax, and thus the caliper is tightly mounted relative to the support member and there is a minimization of wear and loosening therebetween.

Other provisions of the invention or variations will become apparent to those skilled in the art and will suggest themselves from the specific applications of the invention. It is intended that such variations and revisions of the invention, are as are to be expected on the part of those skilled in the art, to suit individual design preference and which incorporate the herein disclosed principles, will be included within the scope of the following claims as equivalents thereof.

We claim:

1. A caliper support key in a disc brake having a caliper supported by a support member, the support member having one of a recess and a protrusion and the caliper having the other of the recess and protrusion, the caliper support key comprising an outer key member that is generally U-shaped and which includes radially outer and radially inner arms connected by a radially extending part, the radially outer arm having an end extending further than and outwardly at an angle away from the radially inner arm, and at least one aperture disposed within the end of the radially outer arm, an inner key member that is shaped complementary to said outer key member, the inner key member also having a radially outer arm with an end which extends further than and outwardly at an angel away from an associated radially inner arm which is connected by a radially extending part with the outer arm of the inner key member, the end of the inner key member having at least one opening therethrough which is in axial alignment with the one aperture, a resilient member disposed between the radially extending parts of the inner and outer key members, the caliper support key received between the protrusion and recess so that the outer key member engages the recess and the inner key member engages the protrusion, and a retaining member extending through said one aperture and one opening and received within a receptacle of one of the support member and caliper, the one aperture and one opening being aligned eccentrically relative to one another, whereby the caliper support key retains the caliper in operational alignment with the support member and receives braking torque so that the resilient member permits movement between the key members.

2. The caliper support key in accordance with claim 1, wherein the radially inner arm of the inner key member comprises a folded-over arm so that the radially inner arm thereof has a thickness that is approximately twice the thickness of the radially outer arm of the inner key member.

3. The caliper support key in accordance with claim 2, wherein the outer key member includes two apertures and the inner key member includes two openings, the respective sets of apertures and openings each being in axial alignment with one another and positioned eccentrically relative to one another in a circumferential direction relative to the brake.

* * * * *